(12) United States Patent
Kato

(10) Patent No.: US 10,862,541 B2
(45) Date of Patent: Dec. 8, 2020

(54) WIRELESS COMMUNICATION DEVICE

(71) Applicant: Murata Manufacturing Co., Ltd., Nagaokakyo (JP)

(72) Inventor: Noboru Kato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 125 days.

(21) Appl. No.: 16/229,023

(22) Filed: Dec. 21, 2018

(65) Prior Publication Data

US 2019/0115953 A1 Apr. 18, 2019

Related U.S. Application Data

(63) Continuation of application No. PCT/JP2018/015367, filed on Apr. 12, 2018.

(30) Foreign Application Priority Data

Jul. 21, 2017 (JP) .................. 2017-141551

(51) Int. Cl.
*H01Q 9/26* (2006.01)
*H04B 5/00* (2006.01)
(Continued)

(52) U.S. Cl.
CPC ......... *H04B 5/0062* (2013.01); *G06K 19/077* (2013.01); *G06K 19/07749* (2013.01);
(Continued)

(58) Field of Classification Search
CPC ......... H01Q 1/2225; H01Q 9/265; H01Q 9/26
See application file for complete search history.

(56) References Cited

U.S. PATENT DOCUMENTS

2009/0201156 A1 8/2009 Kato
2009/0278687 A1 11/2009 Kato
(Continued)

FOREIGN PATENT DOCUMENTS

JP 2011002958 A 1/2011
JP 2015511412 A 4/2015
(Continued)

OTHER PUBLICATIONS

International Search Report issued for PCT/JP2018/015367, dated May 22, 2018.

(Continued)

*Primary Examiner* — Graham P Smith
(74) *Attorney, Agent, or Firm* — Arent Fox LLP

(57) ABSTRACT

An RFID tag is provided that includes a substrate, an RFIC element and a dipole antenna. The dipole antenna includes a first dipole element and a second dipole element. The first dipole element includes a first fold-back portion, and forms a capacitance between the first fold-back portion and a first facing portion. Furthermore, the first dipole element includes a first interposed portion that is interposed between a first open end and the second dipole element. Similarly, the second dipole element includes a second fold-back portion, and forms a capacitance between the second fold-back portion and a second facing portion. Furthermore, the second dipole element includes a second interposed portion that is interposed between a second open end and the first dipole element.

19 Claims, 17 Drawing Sheets

(51) Int. Cl.
    *G06K 19/077*     (2006.01)
    *H01Q 1/22*     (2006.01)

(52) U.S. Cl.
    CPC . *G06K 19/07786* (2013.01); *G06K 19/07788* (2013.01); *H01Q 1/2225* (2013.01); *H01Q 9/26* (2013.01); *H01Q 9/265* (2013.01); *H04B 5/0031* (2013.01)

(56) References Cited

U.S. PATENT DOCUMENTS

| | | |
|---|---|---|
| 2012/0119966 A1 | 5/2012 | Guan et al. |
| 2015/0069135 A1 | 3/2015 | Kang et al. |
| 2016/0350638 A1* | 12/2016 | Kato ................ G06K 19/07728 |
| 2018/0060717 A1 | 3/2018 | Kato et al. |

FOREIGN PATENT DOCUMENTS

| | | |
|---|---|---|
| JP | 2015230502 A | 12/2015 |
| JP | 2015230503 A | 12/2015 |
| JP | 5904316 B1 | 4/2016 |
| WO | 2008126458 A1 | 10/2008 |
| WO | 2009001814 A1 | 12/2008 |
| WO | 2011010725 A1 | 1/2011 |
| WO | 2016072335 A1 | 5/2016 |
| WO | 2017018117 A1 | 2/2017 |

OTHER PUBLICATIONS

Written Opinion of the International Searching Authority issued for PCT/JP2018/015367, dated May 22, 2018.

* cited by examiner

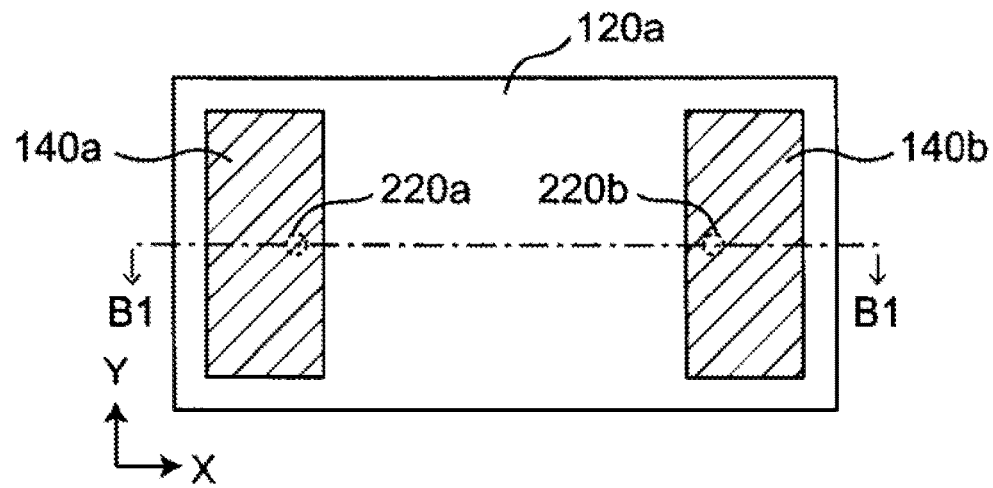
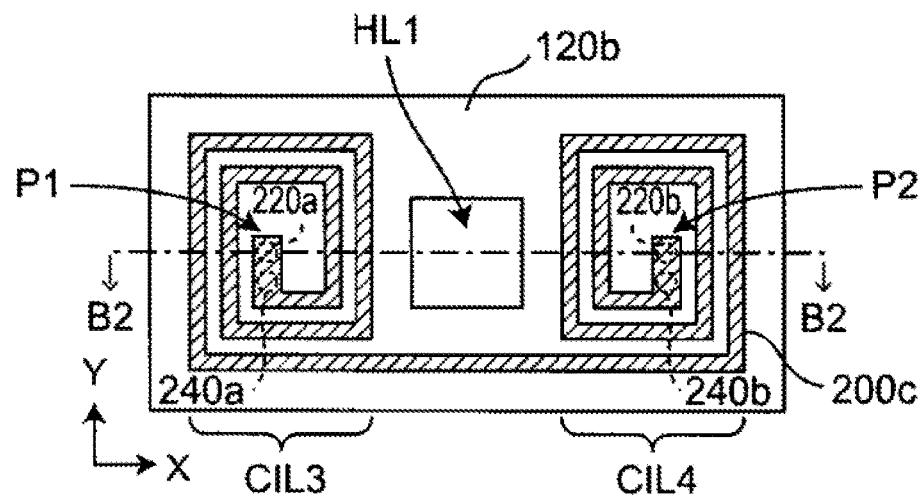
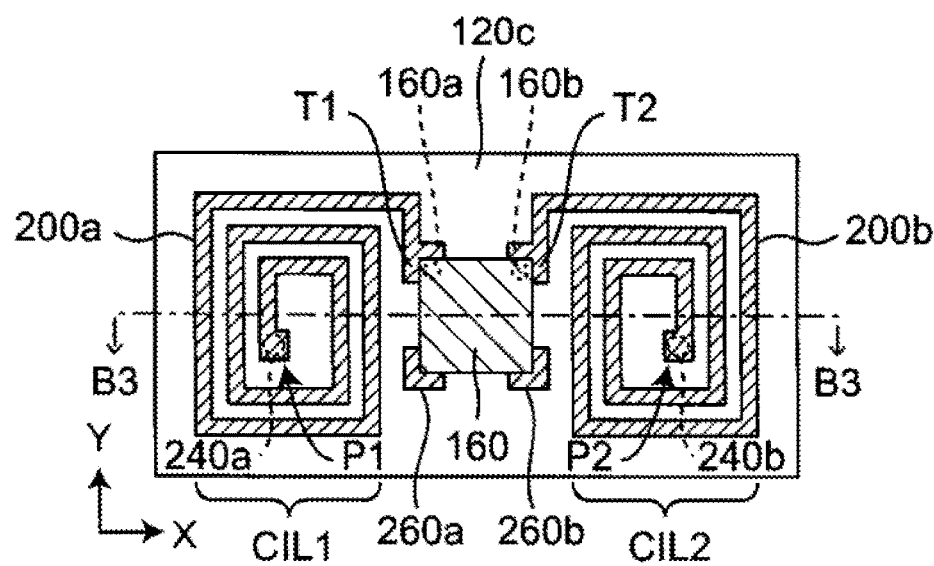

WIRELESS COMMUNICATION DEVICE

CROSS REFERENCE TO RELATED APPLICATIONS

The present application is a continuation of PCT/JP2018/015367 filed Apr. 12, 2018, which claims priority to Japanese Patent Application No. 2017-141551, filed Jul. 21, 2017, the entire contents of each of which are incorporated herein by reference.

BACKGROUND

1. Technical Field

The present invention relates to a wireless communication device such as a radio frequency identification (RFID) tag or a communication module, and, more particularly, to a wireless communication device that includes a dipole antenna.

2. Description of the Related Art

Antennas of RFID tags that use a UHF band generally are dipole antennas. For example, Japanese Patent No. 5904316 discloses an RFID tag that is formed by mounting an RFIC element on a substrate on which a conductor pattern that functions as a dipole antenna is formed. This RFID tag can then be applied, for example, to goods for logistics management, and is read/written by a reader/writer when necessary.

SUMMARY

The conventional dipole antenna described above includes two dipole elements connected to two connection ends of the RFIC element. To miniaturize (i.e., reduce the size of) the dipole antenna, each dipole element is patterned in a meandering shape as disclosed in Japanese Patent No. 5904316.

However, when an application destination space in which a wireless communication device such as an RFID tag or a communication module is provided is limited or when a wireless communication device is applied to small goods or devices, a smaller wireless communication device is necessary.

Although dipole elements patterns need to be made fine to miniaturize the wireless communication device, dimensional accuracy is restricted from a viewpoint of manufacturing of the wireless communication device. Furthermore, as the dipole element patterns are made fine, resistance values of the dipole elements increase. Therefore, when an increase in the resistance values is suppressed to a certain degree, miniaturization of the wireless communication device is naturally limited.

Accordingly, it is an object of the present disclosure to provide a wireless communication device that suppresses an increase in resistance values of dipole elements and is miniaturized when compared to existing devices.

According to an exemplary embodiment, a wireless communication device includes an RFIC element with a first input/output terminal and a second input/output terminal; and a dipole antenna that includes a first dipole element and a second dipole element. Moreover, the first dipole element includes one end connected to the first input/output terminal and another end that is a first open end. Similarly, the second dipole element includes one end which is connected to the second input/output terminal, and another end that is a second open end. The first dipole element includes a first LC parallel circuit which is formed by the first open end and a first open end vicinity portion which is in a vicinity of the first open end, and an intermediate portion of the first dipole element facing each other, and further includes a first capacitance component and a first parallel inductance component. In addition, a first series inductance component is connected in series between the first LC parallel circuit and the first connection end. The second dipole element includes a second LC parallel circuit formed by the second open end and a second open end vicinity portion which is in a vicinity of the second open end, and an intermediate portion of the second dipole element facing each other, and includes a second capacitance component and a second parallel inductance component. A second series inductance component is connected in series between the second LC parallel circuit and the second connection end, and a resonance frequency of the first LC parallel circuit and a resonance frequency of the second LC parallel circuit are not less than twice an operation frequency of the dipole antenna.

Thus, the LC parallel circuit is formed, so that it is possible to obtain a predetermined resonance frequency of the dipole antenna with the line lengths of the first dipole element and the second dipole element shortened. Consequently, it is possible to miniaturize (i.e., reduce the size thereof) the wireless communication device without an increase in resistance values due to the first dipole element and the second dipole element the line widths of which are thinned and which are lengthened.

Furthermore, the wireless communication device according to another exemplary aspect includes a substrate; an RFIC element which is provided at the substrate, and includes a first input/output terminal and a second input/output terminal; and a dipole antenna. The dipole antenna is provided on the substrate, and includes a first dipole element and a second dipole element, with the first dipole element including one end which is a first connection end connected to the first input/output terminal and another end which is a first open end, and the second dipole element including one end which is a second connection end connected to the second input/output terminal, and another end which is a second open end. Moreover, the first dipole element includes a first fold-back portion that is formed such that the first open end faces an intermediate portion of the first dipole element, and a first interposed portion that is interposed in an area which connects the first open end and an outer rim of the second dipole element. Similarly, the second dipole element includes a second fold-back portion that is formed such that the second open end faces an intermediate portion of the second dipole element, and a second interposed portion that is interposed in an area which connects the second open end and an outer rim of the first dipole element.

According to the above configuration, the resonance frequency of the dipole antenna is set to a predetermined value with the line lengths of the first dipole element and the second dipole element shortened. Consequently, it is possible to miniaturize the wireless communication device without an increase in resistance values due to the first dipole element and the second dipole element the line widths of which are thinned and which are lengthened. Furthermore, an unnecessary capacitance produced between the first open end and the first open end vicinity portion of the first dipole element, and the second dipole element (the second open end in particular) is suppressed. Similarly, an unnecessary capacitance produced between the second open end and the second open end vicinity portion of the second dipole element, and the first dipole element (the first open end in particular) is suppressed. Consequently, changes in directivity and a gain are suppressed.

Preferably, the RFIC element is disposed at a center of the substrate, and the first fold-back portion and the second fold-back portion are at positions having a relationship of point symmetry with respect to a position of the RFIC element. According to this structure, the open end of the first dipole element and the open end of the second dipole element are effectively separated, and blocking of electromagnetic radiation of the dipole antenna due to capacitive coupling of the open end of the first dipole element and the open end of the second dipole element is suppressed.

In addition, a formation region of the dipole antenna includes a first end portion and a second end portion which face each other in a first axis direction in a plan view, and a first side portion and a second side portion which face each other in a second axis direction perpendicular to the first axis direction in the plan view. In an exemplary aspect, the first dipole element is a first conductor pattern which includes a meandering portion of a meandering shape between the first input/output terminal and the first end portion, and the second dipole element is a second conductor pattern which includes a meandering portion of a meandering shape between the second input/output terminal and the second end portion. This structure provides a small dipole antenna.

In another aspect, the first open end may enter a gap of the meandering portion of the first conductor pattern, and the second open end may enter a gap of the meandering portion of the second conductor pattern. This structure allows setting the resonance frequency independently from the directivity and the gain of the dipole antenna according to entrance amounts of the first and second open ends inside the meandering portions.

In another aspect, the first dipole element includes first sub conductor pattern which is located between the RFIC element and the first side portion or the second side portion, and the second dipole element includes second sub conductor pattern which is located between the RFIC element and the first side portion or the second side portion. Consequently, it is possible to effectively use the formation region of the dipole antenna, and further miniaturize the dipole antenna accordingly.

For example, the first sub conductor pattern includes a plurality of first sub conductor patterns, the second sub conductor pattern includes a plurality of second sub conductor patterns, the first sub conductor patterns are provided at two positions which sandwich a land connected to the first input/output terminal of the RFIC element and face each other, and the second sub conductor patterns are provided at two positions which sandwich a land connected to the second input/output terminal of the RFIC element and face each other. According to this structure, the first sub conductor patterns formed at two positions which sandwich a land connected to the first input/output terminal of the RFIC element and face each other are shielded by the land, and unnecessary magnetic coupling is suppressed. Consequently, the first and second sub conductor patterns effectively function as part of a radiation element, and an inductance element.

In another exemplary aspect, the formation region of the dipole antenna preferably includes a longitudinal direction and a lateral direction in the plan view, with the longitudinal direction corresponding to the first axis direction and the lateral direction corresponding to the second axis direction. Moreover, a dimension of the formation region in the longitudinal direction is not more than one eighth wavelength of an operation frequency of the dipole antenna. Consequently, an extension direction of the meandering portions of the first dipole element and the second dipole element effectively contributes to radiation of the dipole antenna, so that a long communication distance can be secured with the dipole antenna even made small.

Yet further, the dimension of the formation region in the longitudinal direction preferably is not less than twice a dimension of the formation region in the lateral direction. This structure allows securing a long range of the first dipole element and the second dipole element which respectively extend in substantially opposite directions from the RFIC element, and easily obtaining a predetermined gain of the dipole antenna.

In another exemplary aspect, the RFIC element is preferably an element formed by integrating an RFIC chip, and an impedance matching circuit which matches impedances of the RFIC chip and the dipole antenna. According to this configuration, it is possible to keep electrical characteristics of the wireless communication device alone without being influenced by a dielectric constant and magnetic permeability of a member provided with the wireless communication device.

In an exemplary aspect, the RFIC element is configured to perform communication in a UHF band via the dipole antenna. Consequently, it is possible to adapt to the wireless communication device which uses the UHF band.

According to the exemplary embodiments of the present disclosure, a dipole antenna of a predetermined resonance frequency is formed with line lengths of a first dipole element and a second dipole element shortened, so that it is possible to miniaturize a wireless communication device without an increase in resistance values due to thinned line widths of the first dipole element and the second dipole element.

BRIEF DESCRIPTION OF THE DRAWINGS

FIG. 6A is a plan view illustrating a state where an upper insulation layer of a multilayer board 120 is seen from right above.

FIG. 6B is a plan view of a middle insulation layer of the multilayer board 120.

FIG. 6C is a plan view illustrating a lower insulation layer of the multilayer board 120.

DETAILED DESCRIPTION

Figure 1:
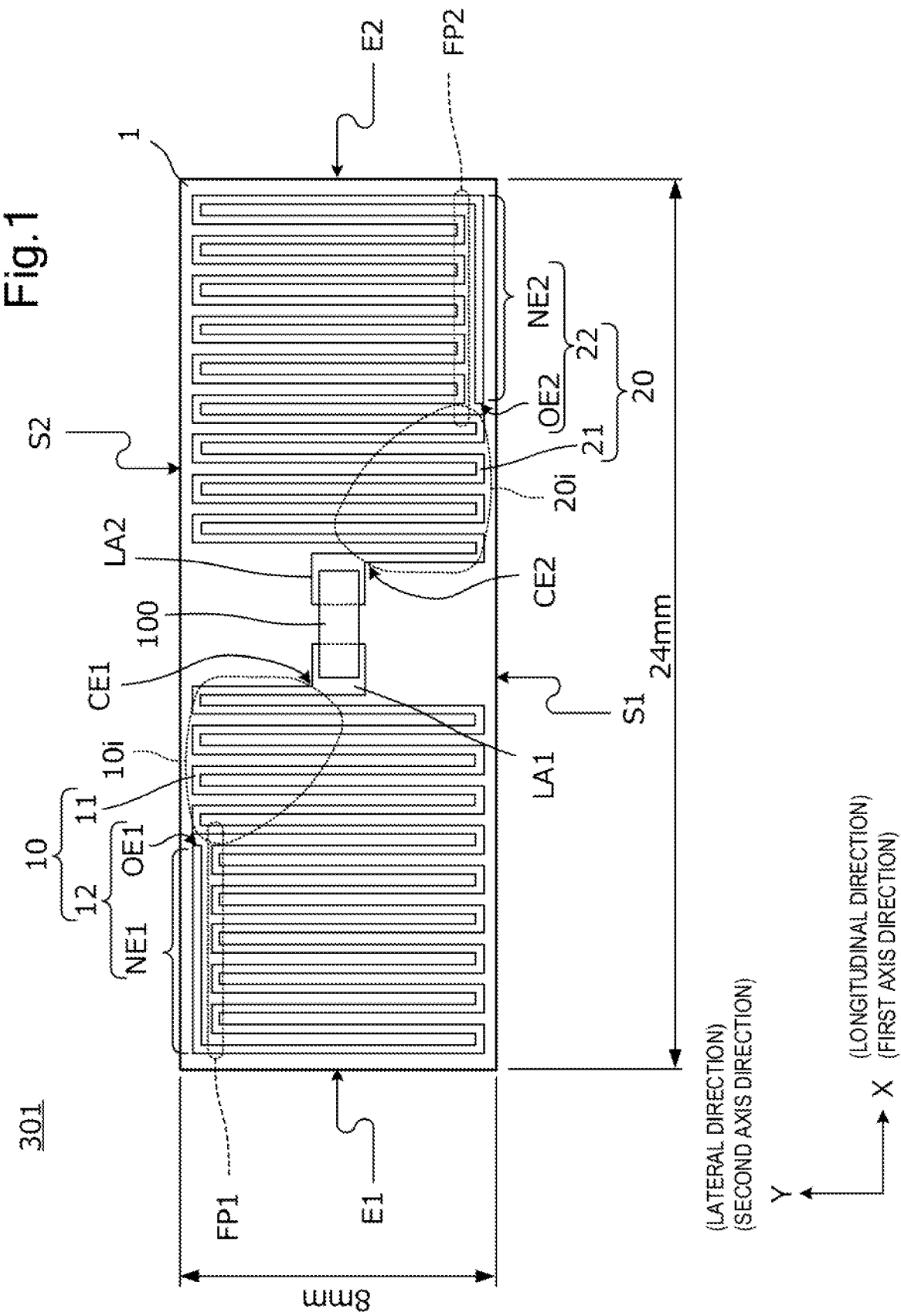
FIG. 1 is a plan view of an RFID tag 301 according to a first embodiment.

Specific exemplary embodiments will be described below with reference to the drawings, and a plurality of exemplary embodiments will be described herein. The same portions will be assigned the same reference numerals in each drawing. Although exemplary embodiments will be separately described for the sake of convenience taking ease of description and understanding of points into account, it should be appreciated that components described in different embodiments can be partially replaced or combined. Second and subsequent embodiments will omit matters common to those in the first embodiment and will describe only differences. The same function and effect provided by the same component in particular will not be successively mentioned.

First Embodiment

FIG. 1 is a plan view of an RFID tag 301 according to a first exemplary embodiment. The RFID tag 301 according to the present embodiment includes a substrate 1 of a rectangular shape, a first dipole element 10 and a second dipole element 20 that are formed on the substrate 1, and an RFIC element 100 that is mounted on the substrate 1. In general, the RFID tag 301 can be considered an example of a "wireless communication device" according to the present disclosure.

According to the exemplary aspect, the substrate 1 includes a first axis direction (an X axis direction in FIG. 1) and a second axis direction (a Y axis direction in FIG. 1) in a plan view. As also shown, the substrate 1 further includes a first end portion E1 (i.e., a first end) and a second end portion E2 (i.e., a second end) that are opposing ends of the substrate 1 facing each other in the first axis direction, and includes a first side portion S1 (i.e., a first side) and a second side portion S2 (i.e., a second side) that are opposing sides facing each other in the second axis direction. In the present embodiment, a substantially entire surface of the substrate is a formation region of a dipole antenna.

Furthermore, the substrate 1 includes a longitudinal direction and a lateral direction in the plan view. The longitudinal direction corresponds to the above first axis direction, and the lateral direction corresponds to the above second axis direction.

Lands LA1 and LA2 on which the RFIC element 100 is mounted are formed at a center (or near a center) of the substrate 1. These lands LA1 and LA2 are connected to a first input/output terminal and a second input/output terminal of the RFIC element 100, respectively.

Moreover, it should be understood that the first dipole element 10 and the second dipole element 20 formed on the substrate 1 form one dipole antenna.

The first dipole element 10 is provided by a first conductor pattern that includes a meandering portion of a meandering shape between the land LA1 and the first end portion E1. The second dipole element 20 is provided by a second conductor pattern that includes a meandering portion of a meandering shape between the land LA2 and the second end portion E2. In an exemplary aspect, line widths of the conductor patterns are 100 µm, and an inter-line distance is 200 µm, for example.

The substrate 1 is, for example, a polyethylene naphthalate (PEN) film. The conductor patterns are patterned by photolithography and etching of a Cu foil applied to the substrate 1.

One end of the first dipole element 10 is a first connection end CE1 connected to the land LA1 (i.e., connected to the first input/output terminal of the RFIC element). The other end of the first dipole element 10 is a first open end OE1. One end of the second dipole element 20 is a second connection end CE2 connected to the land LA2 (i.e., connected to the second input/output terminal of the RFIC element). The other end of the second dipole element 20 is a second open end OE2.

The RFID tag 301 according to the present embodiment has a longitudinal direction dimension of the formation region of the dipole antenna that is 24 mm, a lateral direction dimension which is 8 mm, and a dimension ratio of the lateral direction dimension and the longitudinal direction dimension which is 1:3 according to an exemplary aspect. That is, the longitudinal direction dimension is not less than twice the lateral direction dimension. This structure allows securing a long range of the first dipole element 10 and the second dipole element 20 that respectively extend in substantially opposite directions from the RFIC element 100, and obtaining a predetermined gain of the dipole antenna. Thus, according to the exemplary embodiment, a tag is formed having a very small planar dimension whose longitudinal direction dimension is not more than 50 mm and whose lateral direction dimension is not more than 25 mm and, more specifically, whose longitudinal direction dimension is not more than 30 mm and whose lateral direction dimension is not more than 10 mm.

Furthermore, an operation frequency (½ wavelength fundamental resonance frequency) of this dipole antenna is, for example, 920 MHz, and an effective relative permittivity around an antenna formed by the substrate 1 and a space is approximately 1.5. Therefore, the longitudinal direction dimension (24 mm) is not more than one eighth wavelength (approximately 29 mm) of the operation frequency of the dipole antenna. Consequently, a long communication distance can be secured with the dipole antenna even made small.

The first dipole element 10 includes a main conductor pattern portion 11 and a first fold-back portion (also referred to as a "first fold-back member"). The second dipole element 20 includes a main conductor pattern portion 21 and a second fold-back portion (also referred to as a "second fold-back member").

The first fold-back portion 12 is formed such that the first open end OE1 faces an intermediate portion of the first dipole element 10. This first fold-back portion 12 has a shape folded to extend in a direction towards the RFIC element 100 from an outer rim (the first end portion E1 in the present embodiment) of the formation region of the first dipole element 10. This first fold-back portion 12 includes the first open end OE1, and a first open end vicinity portion NE1 that is adjacent to this first open end OE1. The first fold-back portion 12 faces a facing portion FP1 of the first dipole element.

Similarly, the second fold-back portion 22 is formed such that the second open end OE2 faces an intermediate portion of the second dipole element 20. This second fold-back portion 22 has a shape folded to extend in a direction towards the RFIC element 100 from an outer rim (the second end portion E2 in the present embodiment) of the formation region of the second dipole element 20. This second fold-back portion 22 includes the second open end OE2, and a second open end vicinity portion NE2 which is adjacent to this second open end OE2. The second fold-back portion 22 faces a facing portion FP2 of the second dipole element.

The first dipole element 10 includes a first interposed portion 10i that is interposed/positioned between the first open end OE1 and the second dipole element 20. That is, the first interposed portion 10i in particular is interposed in an area of the first dipole element 10 that connects the first open end OE1 and an outer rim of the second dipole element 20 (a formation region of the second dipole element 20).

Similarly, the second dipole element 20 includes a second interposed portion 20i that is interposed/positioned in an area that connects the second open end OE2 and an outer rim of the first dipole element 10.

The above noted RFIC element is disposed at the center of the substrate 1, and the first fold-back portion 12 and the second fold-back portion 22 are at positions having a relationship of point symmetry with respect to a position of the RFIC element 100. Furthermore, in the present embodiment, the entirety of the first dipole element 10 and the second dipole element 20 have a relationship of point symmetry with respect to the position of the RFIC element 100.

Figure 2A:
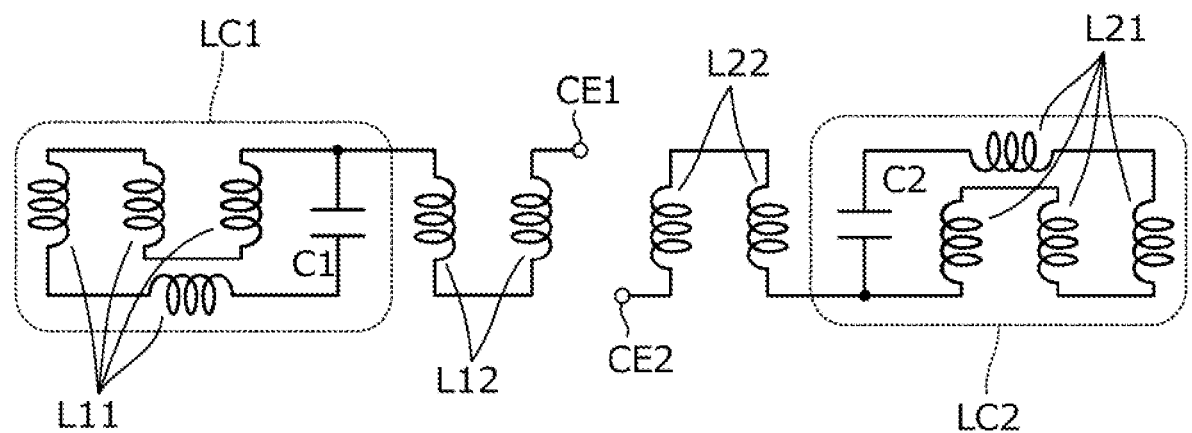
FIG. 2A is an equivalent circuit diagram of a dipole antenna according to the first embodiment.
Figure 2B:
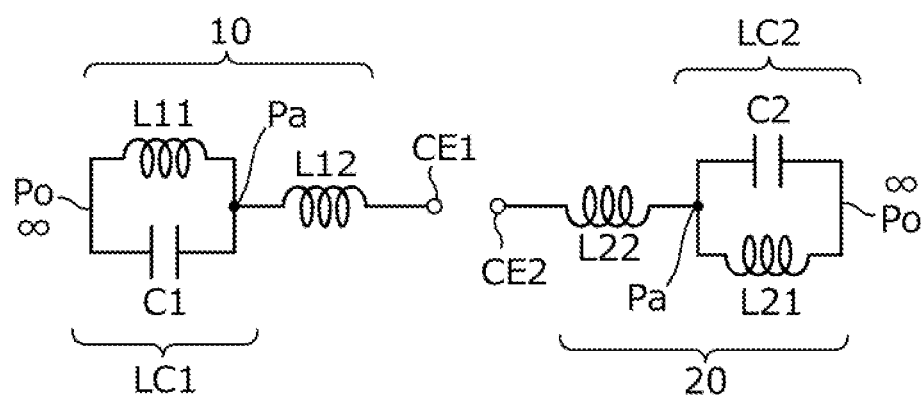
FIG. 2B is an equivalent circuit diagram obtained by further simplifying the equivalent circuit illustrated in FIG. 2A.

FIG. 2A is an equivalent circuit diagram of the dipole antenna according to the present embodiment. FIG. 2B is an equivalent circuit diagram obtained by further simplifying the equivalent circuit illustrated in FIG. 2A. In FIGS. 2A and 2B, a capacitance element C1 corresponds to a capacitance produced between the first fold-back portion 12 and the first facing portion FP1 illustrated in FIG. 1. That is, the capacitance element C1 corresponds to a first capacitance component formed by the first open end OE1 and a vicinity portion of this first open end, and the intermediate portion of the first dipole element 10 facing each other. Furthermore, an inductance element L11 in FIGS. 2A and 2B corresponds to a first parallel inductance component produced in the conductor pattern including the first facing portion FP1 in first dipole element 10. Furthermore, an inductance element L12 corresponds to a first series inductance component produced in a conductor pattern other than the conductor pattern including the first facing portion FP1 in the first dipole element 10.

Similarly, in FIGS. 2A and 2B, a capacitance element C2 corresponds to a capacitance produced between the second fold-back portion 22 and the second facing portion FP2 illustrated in FIG. 1. That is, the capacitance element C2 corresponds to a second capacitance component formed by the second open end OE2 and a vicinity portion of this second open end, and the intermediate portion of the second dipole element 20 facing each other. Furthermore, an inductance element L21 in FIGS. 2A and 2B corresponds to a second parallel inductance component produced in the conductor pattern including the second facing portion FP2 in the second dipole element 20. Furthermore, an inductance element L22 corresponds to a second series inductance component produced in a conductor pattern other than the conductor pattern including the second facing portion FP2 in the second dipole element 20.

The capacitance element C1 and the inductance element L11 form a first LC parallel circuit LC1. That is, the first dipole element 10 includes the first LC parallel circuit LC1, and the inductance element L12 connected in series between this first LC parallel circuit LC1 and the first connection end CE1.

Similarly, the capacitance element C2 and the inductance element L21 form a second LC parallel circuit LC2. The second dipole element 20 includes the second LC parallel circuit LC2, and the inductance element L22 connected in series between this second LC parallel circuit LC2 and the second connection end CE2.

In FIG. 2B, a first end Po of the first LC parallel circuit LC1 is an open end of the first dipole element 10, and therefore its impedance can be expressed as infinite. An impedance between both ends of the first LC parallel circuit LC1 becomes infinite at a parallel resonance frequency (e.g., 1.8 GHz) of the first LC parallel circuit LC1, and the first LC parallel circuit LC1 does not function as a radiation element. However, the first LC parallel circuit LC1 becomes inductive at a frequency band lower than this resonance frequency, and an impedance of a second end Pa point of the first LC parallel circuit takes a certain value (e.g., 500Ω) lower than infinite. That is, the first LC parallel circuit contributes to radiation at this frequency. The above applies likewise to the second LC parallel circuit LC2.

Figure 3:
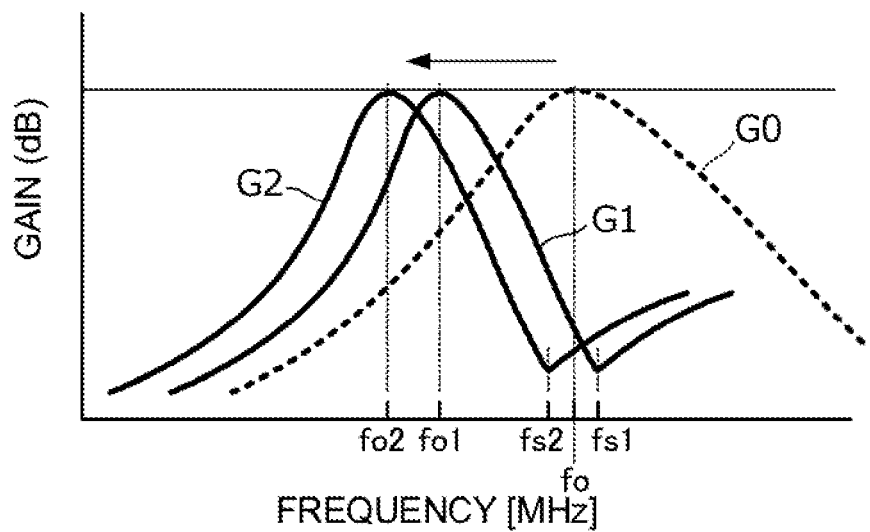
FIG. 3 is a view illustrating frequency characteristics of a gain of the dipole antenna according to the first embodiment.

FIG. 3 is a view illustrating frequency characteristics of a gain of the dipole antenna according to the present embodiment. In FIG. 3, a curve G0 indicates frequency characteristics of the gain of the dipole antenna in a case where there is not the first LC parallel circuit LC1 and the second LC parallel circuit LC2 illustrated in FIGS. 2A and 2B. In this example, a frequency fo is the resonance frequency of the dipole antenna, and the gain comes to a peak at this frequency fo. Curves G1 and G2 both indicate frequency characteristics of a gain of the dipole antenna provided with the first LC parallel circuit LC1 and the second LC parallel circuit LC2. In an example of the dipole antenna indicated by the curve G1, resonance frequencies of the first LC parallel circuit LC1 and the second LC parallel circuit LC2 are fs1, and the resonance frequency of the dipole antenna is fo1. Furthermore, in an example of the dipole antenna indicated by the curve G2, resonance frequencies of the first LC parallel circuit LC1 and the second LC parallel circuit LC2 are fs2, and the resonance frequency of the dipole antenna is fo2.

Thus, the dipole antenna includes the first LC parallel circuit LC1 and the second LC parallel circuit LC2, so that the resonance frequency of the dipole antenna is lowered. Furthermore, as the capacitances of the capacitance elements C1 and C2 are increased (the resonance frequency is lowered), the resonance frequencies of the first LC parallel circuit LC1 and the second LC parallel circuit LC2 lower, and the resonance frequency of the dipole antenna lowers. Consequently, the LC parallel circuits are formed, so that the dipole antenna can provide a predetermined resonance frequency with the line lengths of the first dipole element and the second dipole element shortened.

The RFID tag according to the present embodiment is an RFID tag that is configured to use a UHF band, and the operation frequency of the above dipole antenna is a 920 MHz band, for example. On the other hand, the resonance frequency of the first LC parallel circuit LC1 and the resonance frequency of the second LC parallel circuit LC2 are not less than twice the operation frequency of the dipole antenna. For example, the resonance frequencies are in the range of 1.5 GHz to 3 GHz both inclusive.

According to this relationship, the resonance frequencies of the first LC parallel circuit LC1 and the second LC parallel circuit LC2 have inductivity at the 920 MHz band, and the line lengths of the first and second dipole elements (line lengths of conductor patterns of meandering shapes) become equivalently long.

According to the above configuration, the dipole antenna can be provided with a predetermined resonance frequency with the line lengths of the first dipole element 10 and the second dipole element 20 shortened. Consequently, it is possible to miniaturize the RFID tag without an increase in resistance values due to the line widths of the first dipole element 10 and the second dipole element 20 which are thinned.

Furthermore, according to the present embodiment, as illustrated in FIG. 1, the first interposed portion 10i is interposed between the first open end OE1 and the second dipole element 20. Consequently, an unnecessary (i.e., unwanted) capacitance produced between the first open end OE1 and the first open end vicinity portion NE1 of the first dipole element 10, and the second dipole element 20 (the second open end OE2 in particular) is suppressed. Similarly, an unnecessary (i.e., unwanted) capacitance produced between the second open end OE2 and the second open end vicinity portion NE2 of the second dipole element 20, and the first dipole element 10 (the first open end OE1 in particular) is suppressed. Consequently, a change in directivity and a decrease in the gain of the dipole antenna are suppressed. In general, it should be appreciated that small RFIDs have short reading distances as directivity changes, and therefore it is important to achieve the miniaturization while keeping the directivity.

Furthermore, according to the present embodiment, the meandering-shaped conductor pattern of the first dipole element 10 is provided between the first open end OE1 and the first connection end CE1, so that a stray capacitance is minimized between the conductor pattern close to the first connection end CE1 and the first open end OE1. Similarly, the meandering-shaped conductor pattern of the second dipole element 20 is provided between the second open end OE2 and the second connection end CE2, so that a stray capacitance is minimized between the conductor pattern close to the second connection end CE2 and the second open end OE2. Therefore, even when the length of the first fold-back portion 12 and the length of the second fold-back portion 22 are changed, impedance matching characteristics of the RFIC element 100 and the dipole antenna hardly change. This suppresses a decrease in the reading distance of the RFID tag.

It is noted that a conventional dipole antenna including spiral-shaped conductor patterns formed at distal end portions of dipole elements changes both of a capacitance component and an inductance component due to the lengths of the spiral-shaped conductor patterns, and therefore has difficulty in setting a resonance frequency of the dipole antenna to a predetermined value. By contrast with this, according to the present embodiment, the fold-back portion 12 hardly functions as an inductance element, and functions as a capacitance formation conductor pattern configured to form the capacitance between the capacitance formation conductor pattern and a meandering-shaped conductor pattern. Consequently, it is possible to independently set an additional capacitance.

A configuration and a function of the RFIC element 100 will be described below.

Figure 4:
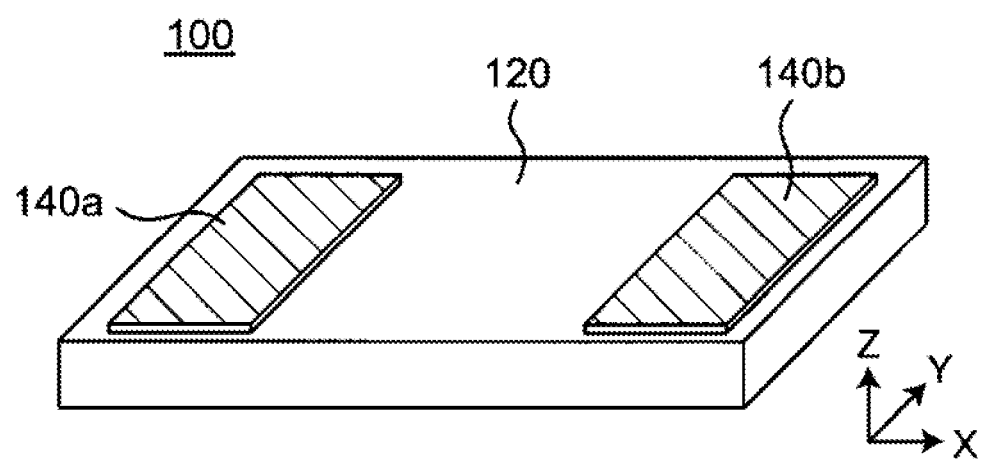
FIG. 4 is a perspective view of an RFIC element 100.

FIG. 4 is a perspective view of the RFIC element 100. The RFIC element 100 is, for example, an RFIC element that supports a 900 MHz band, that is, a communication frequency of the UHF band. The RFIC element 100 includes a multilayer board 120 whose principal surface is rectangular. The multilayer board 120 has flexibility. The multilayer board 120 includes, for example, a laminated body structure formed by laminating resin insulation layers such as polyimide or liquid crystal polymer having flexibility. The dielectric constant of each insulation layer made of these materials is smaller than the dielectric constant of a ceramic substrate layer which is typically LTCC.

Hereinafter, a length direction of the multilayer board 120 is an X axis, a width direction of the multilayer board 120 is a Y axis, and a thickness direction of the multilayer board 120 is a Z axis.

Figure 5:
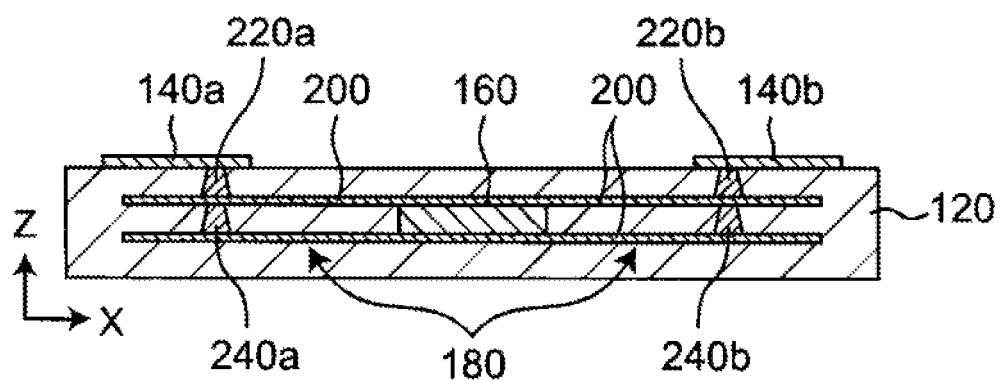
FIG. 5 is a vertical cross-sectional view of the RFIC element illustrated in FIG. 4.
Figure 7A:
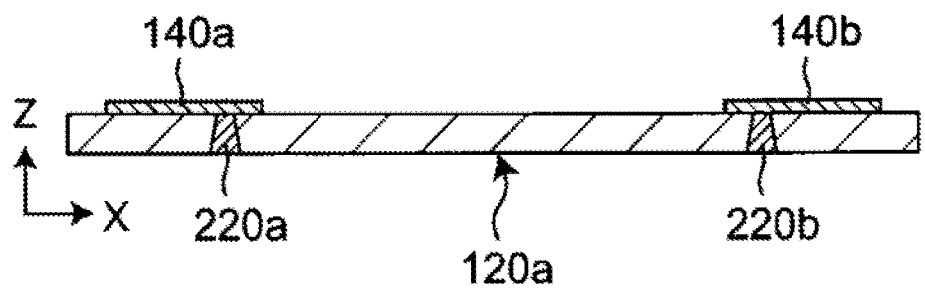
FIG. 7A is a cross-sectional view of the insulation layer, taken along line B1-B1 in FIG. 6A.
Figure 7B:
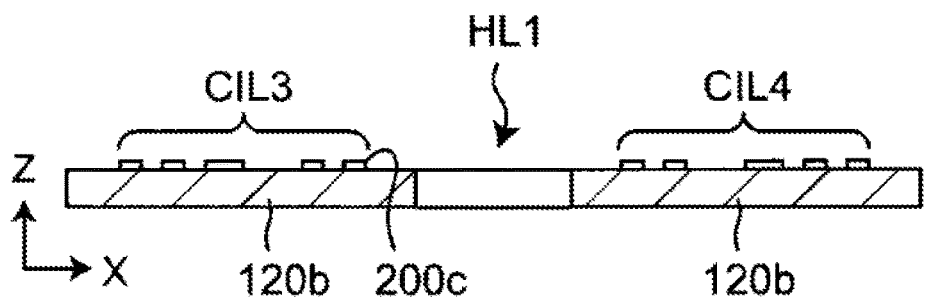
FIG. 7B is a cross-sectional view of the insulation layer, taken along line B2-B2 in FIG. 6B.
Figure 7C:
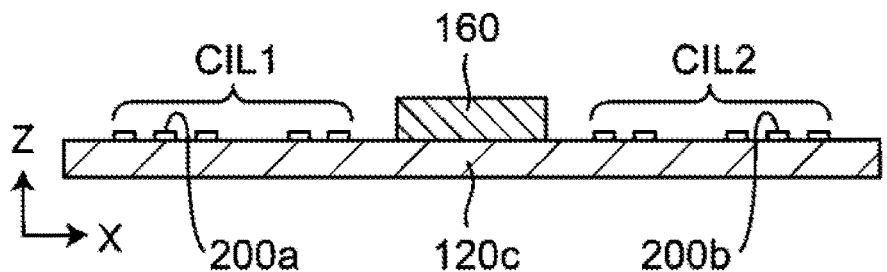
FIG. 7C is a cross-sectional view of the insulation layer, taken along line B3-B3 in FIG. 6C.

FIG. 5 is a vertical cross-sectional view of the RFIC element illustrated in FIG. 4. FIG. 6A is a plan view illustrating a state where an upper insulation layer of a multilayer board 120 is seen from right above. FIG. 6B is a plan view of a middle insulation layer of the multilayer board 120. FIG. 6C is a plan view illustrating a lower insulation layer of the multilayer board 120. FIG. 7A is a cross-sectional view of the insulation layer, taken along line B1-B1 in FIG. 6A. FIG. 7B is a cross-sectional view of the insulation layer, taken along line B2-B2 in FIG. 6B. FIG. 7C is a cross-sectional view of the insulation layer, taken along line B3-B3 in FIG. 6C.

As illustrated in FIG. 5, an RFIC chip 160 and an impedance matching circuit 180 are built in the multilayer board 120. A first terminal electrode 140a and a second terminal electrode 140b are formed on one principal surface of the multilayer board 120. Matching circuit 180 is configured to match impedances of the RFIC chip 160, and the first dipole element 10 and the second dipole element 20, and to thus set resonance frequency characteristics of the antenna.

The RFIC chip 160 includes a structure in which various elements are built in a hard semiconductor substrate whose material is a semiconductor such as silicone. Both principal surfaces of the RFIC chip 160 have square shapes. Furthermore, as illustrated in FIG. 6C, a first input/output terminal 160a and a second input/output terminal 160b are formed on the other principal surface of the RFIC chip 160. Inside the multilayer board 120, the RFIC chip 160 is located at the center in each of the X axis, the Y axis and the Z axis with each side of the square shape extending along the X axis direction or the Y axis direction, and with the one principal surface and the other principal surface parallel to an X-Y plane.

According to the exemplary aspect, the matching circuit 180 includes a coil conductor 200 and inter-layer connection conductors 240a and 240b. The coil conductor 200 includes coil patterns 200a to 200c illustrated in FIG. 6B or 6C. Part of the coil pattern 200a is formed by a first coil portion CIL1. Part of the coil pattern 200b is formed by a second coil portion CIL2. Part of the coil pattern 200c is formed by a third coil portion CIL3 and a fourth coil portion CIL4.

The first coil portion CIL1, the third coil portion CIL3 and the inter-layer connection conductor 240a are disposed to align in the Z axis direction. The second coil portion CIL2, the fourth coil portion CIL4 and the inter-layer connection conductor 240b are also disposed to align in the Z axis direction.

When the multilayer board 120 is seen from the Z axis direction, the RFIC chip 160 is disposed between the first coil portion CIL1 and the second coil portion CIL2. Furthermore, when the multilayer board 120 is seen from the Y axis direction, the RFIC chip 160 is disposed between the third coil portion CIL3 and the fourth coil portion CIL4.

The first terminal electrode 140a and the second terminal electrode 140b are both formed in strip shapes by using a copper foil having flexibility as a material. Principal surface sizes of the first terminal electrode 140a and the second terminal electrode 140b match with each other. Short sides of the first terminal electrode 140a and the second terminal electrode 140b extend in the X axis direction. Long sides of the first terminal electrode 140a and the second terminal electrode 140b extend in the Y axis direction.

Hence, when the multilayer board 120 is seen from the Y axis direction, the RFIC chip 160 is sandwiched between part of the matching circuit 180 and the other part of the matching circuit 180. Furthermore, when the multilayer board 120 is seen from the X axis direction, the RFIC chip 160 overlaps the matching circuit 180. When the multilayer board 120 is seen in the plan view, the matching circuit 180 partially overlaps each of the first terminal electrode 140a and the second terminal electrode 140b.

As illustrated in FIGS. 6A to 6C, the multilayer board 120 includes three laminated insulation layers 120a to 120c of sheet shapes. The insulation layer 120a is located at an upper portion, the insulation layer 120b is located at a middle portion and the insulation layer 120c is located at a lower portion.

The first terminal electrode 140a and the second terminal electrode 140b are formed (i.e., disposed) on one principal surface of the insulation layer 120a. A through-hole HL1 of a rectangular shape is formed at a center position of one principal surface of the insulation layer 120b, and the through-hole HL1 reaches the other principal surface. The through-hole HL1 is formed in a size in which it includes the RFIC chip 160. Furthermore, the coil pattern 200c is formed around the through-hole HL1 on the one principal surface of the insulation layer 120b. The coil pattern 200c is formed by using a copper foil having flexibility as a material.

A first end of the coil pattern 200c is disposed at a position at which this first end overlaps the first terminal electrode 140a in the plan view, and is connected to the first terminal electrode 140a by the inter-layer connection conductor 220a extending in the Z axis direction. Furthermore, the second end of the coil pattern 200c is disposed at a position at which this second end overlaps the second terminal electrode 140b in the plan view, and is connected to the second terminal electrode 140b by the inter-layer connection conductor 220b extending in the Z axis direction. In an exemplary aspect, the inter-layer connection conductors 220a and 220b are formed by using a hard metal bulk whose main component is Sn.

The coil patterns 200a and 200b are formed on one principal surface of the insulation layer 120c. The coil patterns 200a and 200b are formed by using a copper foil having flexibility as a material.

A first coil end T1 and a second coil end T2 are both formed in rectangular shapes when the insulation layer 120c is seen in the plan view.

One end portion of the coil pattern 200a is connected to the one end portion (i.e., the first end) of the coil pattern 200c by the inter-layer connection conductor 240a extending in the Z axis direction. One end portion of the coil pattern 200b is connected to the other end portion (i.e., the second end) of the coil pattern 200c by the inter-layer connection conductor 240b extending in the Z axis direction. In an exemplary aspect, the inter-layer connection conductors 240a and 240b are formed by using a hard metal bulk whose main component is Sn.

When the insulation layers 120b and 120c are seen in the plan view, part of a section of the coil pattern 200a overlaps part of a section of the coil pattern 200c, and part of a section of the coil pattern 200b also overlaps the other part of a section of the coil pattern 200c. Here, among the sections in which the coil patterns 200a and 200c overlap, a section on the coil pattern 200a side will be referred to as the "first coil portion CIL1", and the section on the coil pattern 200c side will be referred to as the "third coil portion CIL3" for purposes of the present disclosure. Furthermore, among the sections in which the coil patterns 200b and 200c overlap, a section on the coil pattern 200b side will be referred to as the "second coil portion CIL2", and the section on the coil pattern 200c side will be referred to as the "fourth coil portion CIL4" for purposes of the present disclosure. Furthermore, a position of the one end portion of the coil pattern 200a or the one end portion of the coil pattern 200c will be referred to as a "first position P1", and a position of the one end portion of the coil pattern 200b or the other end portion of the coil pattern 200c will be referred to as a "second position P2" for purposes of the present disclosure.

In an exemplary aspect, dummy conductors 260a and 260b of rectangular shapes are formed on one principal surface of the insulation layer 120c. The dummy conductors 260a and 260b are formed by using a copper foil having flexibility as a material. When the insulation layers 120b and 120c are seen in the plan view, the dummy conductors 260a and 260b are disposed so as to overlap two corner portions among four corner portions of the through-hole HL1 of the rectangular shape.

Moreover, the RFIC chip 160 is mounted on the insulation layer 120c such that four corners on its other principal surface face the first coil end T1, the second coil end T2 and the dummy conductors 260a and 260b, respectively. The first input/output terminal 160a is disposed on the other principal surface of the RFIC chip 160 to overlap the first coil end T1 in the plan view. Similarly, the second input/output terminal 160b is disposed on the other principal surface of the RFIC chip 160 to overlap the second coil end T2 in the plan view.

As a result, the RFIC chip 160 is connected to the first coil end T1 by the first input/output terminal 160a, and is connected to the second coil end T2 by the second input/output terminal 160b.

In addition, the thicknesses of the insulation layers 120a to 120c are not less than 10 µm and not more than 100 µm in the exemplary embodiment. Hence, the RFIC chip 160 and the matching circuit 180 built in the multilayer board 120 are seen through from an outside. Consequently, it is possible to easily check a connection state of the RFIC chip 160 and the matching circuit 180 (whether connection is disconnected).

Figure 8:
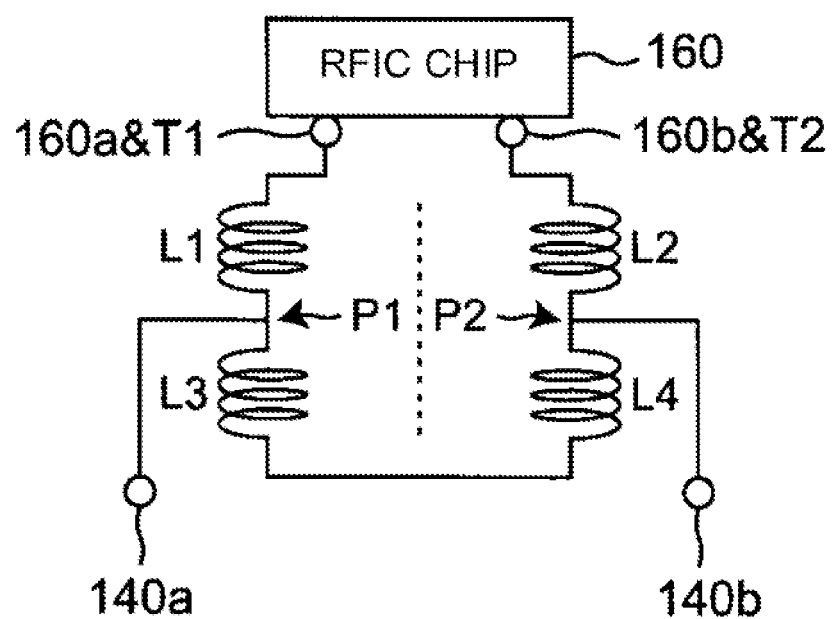
FIG. 8 is a view illustrating an equivalent circuit of the RFIC element 100.

FIG. 8 is a view illustrating an equivalent circuit of the RFIC element 100 configured as described above. In FIG. 8, an inductor L1 corresponds to the first coil portion CIL1. An inductor L2 corresponds to the second coil portion CIL2. An inductor L3 corresponds to the third coil portion CIL3. An inductor L4 corresponds to the fourth coil portion CIL4. Impedance matching characteristics with the matching circuit 180 are defined by values of the inductors L1 to L4.

A first end of the inductor L1 is connected to the first input/output terminal 160a provided to the RFIC chip 160. Moreover, a first end of the inductor L2 is connected to the second input/output terminal 160b provided to the RFIC chip 160. The other (i.e., a second) end portion of the inductor L1 is connected to a first end of the inductor L3. The other (i.e., a second) end portion of the inductor L2 is connected to a first end of the inductor L4. The other (i.e., a second) end portion of the inductor L3 is connected to the other (i.e., a second) end portion of the inductor L4. The first terminal electrode 140a is connected to connection points of the inductors L1 and L3. The second terminal electrode 140b is connected to connection points of the inductors L2 and L4.

Figure 9:
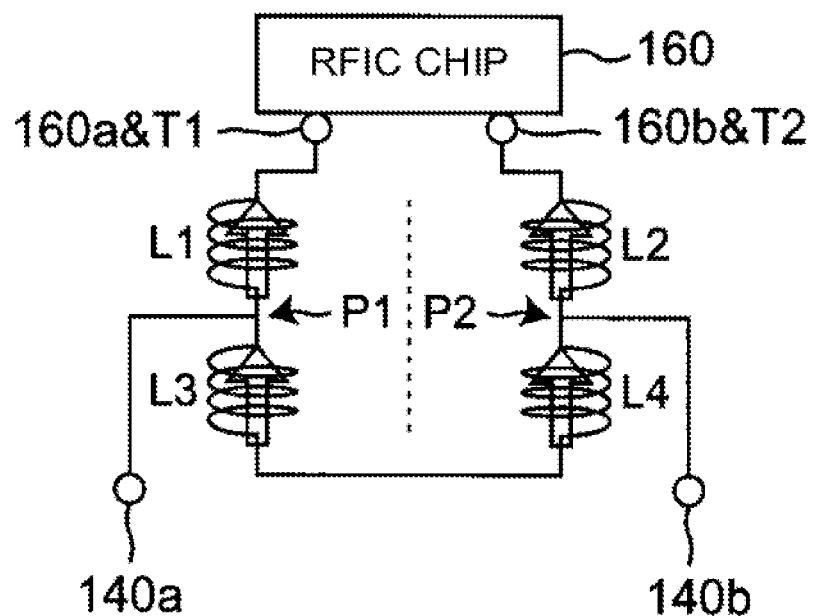
FIG. 9 is a view illustrating a direction of magnetic fields produced in inductors L1 to L4 of the RFIC element 100.

As is clear from the equivalent circuit illustrated in FIG. 8, the first coil portion CIL1, the second coil portion CIL2, the third coil portion CIL3 and the fourth coil portion CIL4 are wound such that magnetic fields are in-phase, and connected to each other in series. Hence, the magnetic fields are produced to be directed in directions indicated by arrows in FIG. 9 at a certain point of time. On the other hand, the magnetic fields are produced to be directed in directions opposite to directions indicated by arrows in FIG. 9 at another point of time.

Furthermore, as is clear from FIGS. 6B and 6C noted above, the first coil portion CIL1 and the third coil portion CIL3 have the substantially same loop shapes and the same first winding axis. Similarly, the second coil portion CIL2 and the fourth coil portion CIL4 have the substantially same loop shapes and the same second winding axis. The first winding axis and the second winding axis are disposed at positions which sandwich the RFIC chip 160.

That is, the first coil portion CIL1 and the third coil portion CIL3 are magnetically and capacitively coupled. Similarly, the second coil portion CIL2 and the fourth coil portion CIL4 are magnetically and capacitively coupled.

As is clear from the above description, the RFIC chip 160 includes the first input/output terminal 160a and the second input/output terminal 160b, and is built (i.e., disposed) in the multilayer board 120. Furthermore, the matching circuit 180 includes the coil patterns 200a to 200c, and is built in the multilayer board 120. Among them, the coil pattern 200a includes the other end portion (first coil end T1) connected to the first input/output terminal 160a, and the coil pattern 200b includes the other end portion (second coil end T2) connected to the second input/output terminal 160b. Furthermore, the first terminal electrode 140a and the second terminal electrode 140b are provided on one principal surface of the multilayer board 120. The first terminal electrode 140a is connected to the one end portion (first position P1) of the coil pattern 200a. The second terminal electrode 140b is connected to the one end portion (second position P2) of the coil pattern 200b.

Furthermore, the first coil portion CIL1 exists in the section from the first coil end T1 to the first position P1, and includes the first winding axis in a direction intersecting the one principal surface of the multilayer board 120. The second coil portion CIL2 exists in the section from the second coil end T2 to the second position P2, and includes the second winding axis in a direction intersecting the one principal surface of the multilayer board 120. The third coil portion CIL3 is disposed so as to overlap the first coil portion CIL1 in the plan view. The fourth coil portion CIL4 is disposed so as to overlap the second coil portion CIL2 in the plan view. The first coil portion CIL1 and the third coil portion CIL3, and the second coil portion CIL2 and the fourth coil portion CIL4 are disposed at positions which sandwich the RFIC chip 160. The matching circuit 180 and the RFIC chip 160 are built in the multilayer board 120.

According to an exemplary aspect, the RFIC chip 160 is formed by a semiconductor substrate. Hence, the RFIC chip 160 functions as a ground or a shield for the first coil portion CIL1, the second coil portion CIL2, the third coil portion CIL3 and the fourth coil portion CIL4. As a result, the first coil portion CIL1 and the second coil portion CIL2 as well as the third coil portion CIL3 and the fourth coil portion CIL4 are hardly coupled both magnetically and capacitively. Consequently, a passband of a communication signal is suppressed from being a narrower band.

Figure 10:
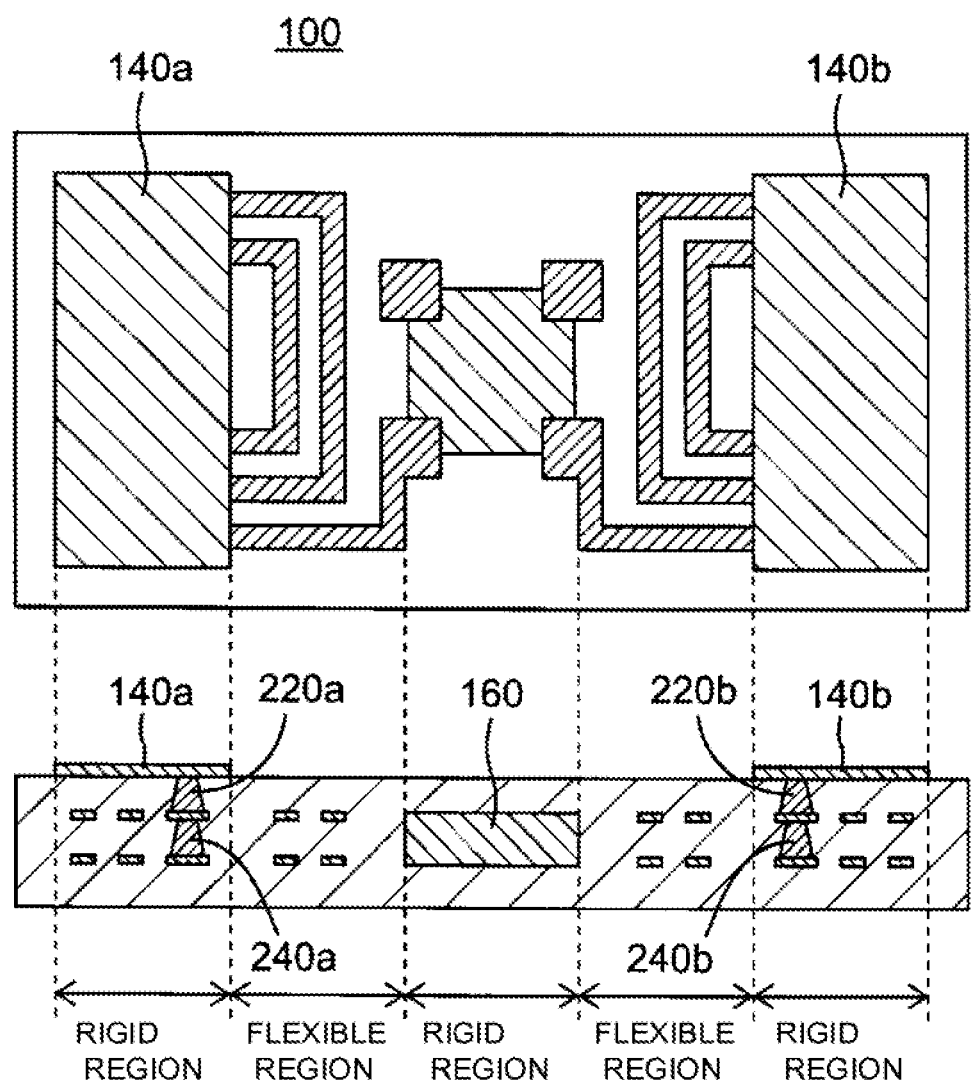
FIG. 10 is a view illustrating a distribution of rigid regions and flexible regions of the RFIC element 100.
Figure 11:
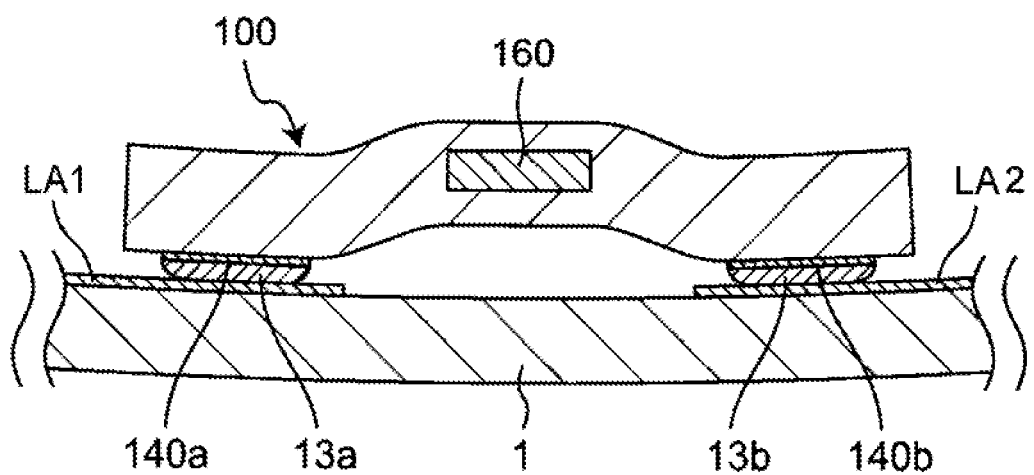
FIG. 11 is a view illustrating a warping state of an RFID tag formed by attaching the RFIC element 100 to lands LA1 and LA2.

Next, an example where the RFIC element 100 is attached onto the lands LA1 and LA2 by conductive bonding members 13a and 13b such as solders will be described. FIG. 10 is a view illustrating a distribution of rigid regions and flexible regions of the RFIC element 100. FIG. 11 is a view illustrating a warping state of an RFID tag formed by attaching the RFIC element 100 to the lands LA1 and LA2.

As described above, the multilayer board 120, the coil patterns 200a to 200c, the first terminal electrode 140a and the second terminal electrode 140b are made by members having flexibility. On the other hand, the inter-layer connection conductors 220a, 220b, 240a and 240b and the RFIC chip 160 are made by hard members. Furthermore, the first terminal electrode 140a and the second terminal electrode 140b have relatively large sizes, and therefore have low flexibility. Furthermore, when plated films such as Ni/Au or Ni/Sn are applied to the first terminal electrode 140a and the second terminal electrode 140b, the flexibility of the first terminal electrode 140a and the second terminal electrode 140b further lowers.

Hence, as illustrated in FIG. 10, the rigid regions and the flexible regions are formed in the RFIC element 100. More specifically, regions in which the first terminal electrode 140a, the second terminal electrode 140b and the RFIC chip 160 are disposed are the rigid regions, and other regions are the flexible regions. More particularly, the first terminal electrode 140a and the second terminal electrode 140b are provided at positions apart from the RFIC chip 160 (as seen in the planar direction). Therefore, there are the flexible regions between the first terminal electrode 140a and the RFIC chip 160 and between the second terminal electrode 140b and the RFIC chip 160.

Hence, when the RFID tag formed by applying the RFIC element 100 to the lands LA1 and LA2 of the substrate 1 is applied to a curved surface, the RFIC element 100 warps as illustrated in FIG. 11, for example.

Figure 12:
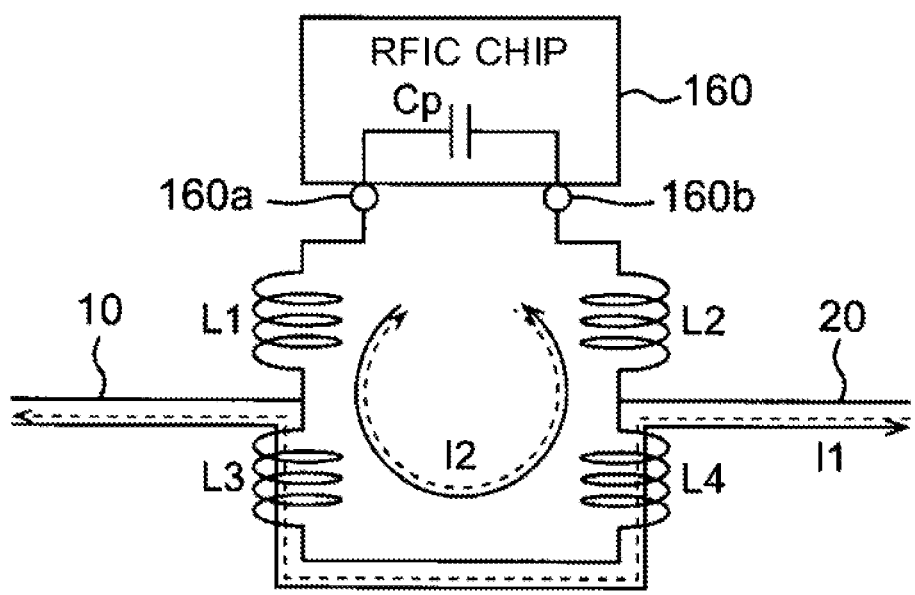
FIG. 12 is a view illustrating an example of a current flowing in the equivalent circuit of the RFID tag in FIG. 11.
Figure 13:
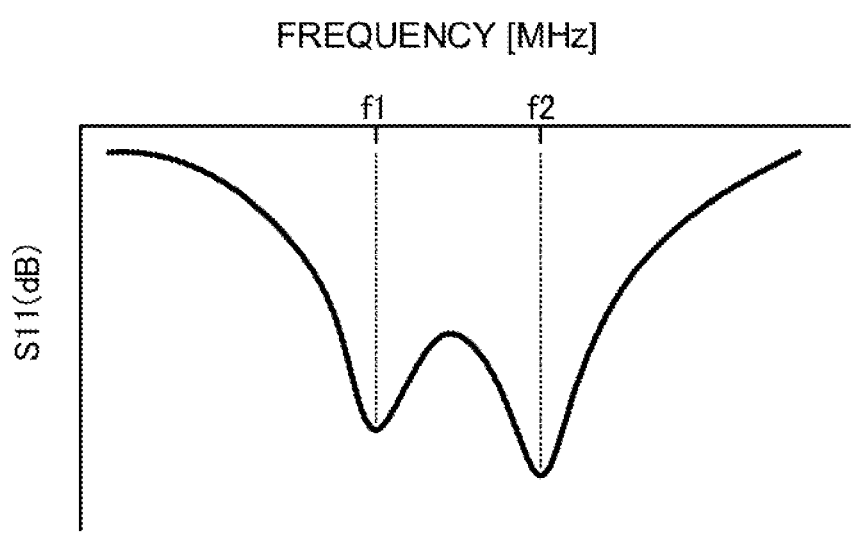
FIG. 13 is a view illustrating frequency characteristics of reflection loss when a circuit connected to an RFIC chip of the RFID tag in FIG. 11 is seen from the RFIC chip.

FIG. 12 is a view illustrating an example of a current flowing in the equivalent circuit of the RFID tag in FIG. 11. FIG. 13 is a view illustrating frequency characteristics of reflection loss when a circuit connected to the RFIC chip of the RFID tag in FIG. 11 is seen from the RFIC chip.

As illustrated in FIG. 12, a parasitic capacitance (i.e., a stray capacitance) Cp included by the RFIC chip 160 is provided between the first input/output terminal 160a and the second input/output terminal 160b. Hence, RFIC element 100 causes two resonances. The first resonance is a resonance that occurs in a current path formed by the first dipole element 10, the second dipole element 20 and the inductors L3 and L4. The second resonance is a resonance that occurs in a current path (i.e., a current loop) formed by the inductors L1 to L4 and the parasitic capacitance Cp. These two resonances are coupled by the inductors L3 and L4 shared by each current path. Two currents I1 and I2 corresponding to the two resonances flow as indicated by broken line arrows in FIG. 12.

Furthermore, both of the first resonance frequency and the second resonance frequency are influenced by the inductors L3 and L4. Thus, as illustrated in FIG. 13, a difference of several 10 MHz (more specifically, approximately not less than 5 MHz and not more than 50 MHz) is produced between a first resonance frequency f1 and a second resonance frequency f2. By coupling the two resonances in this way, it is possible to obtain resonance frequency characteristics of a wide band as illustrated in FIG. 13.

According to the present embodiment, the impedance matching circuit that matches the impedances of the RFIC chip 160 in the RFIC element 100, and the first dipole element 10 and the second dipole element 20, and sets the resonance frequency characteristics of the antenna is provided, so that a following function and effect are obtained.

First, a circuit for matching impedances and setting resonance frequency characteristics does not need to be formed on a substrate. As such, it is possible to effectively use an area of the substrate as a space for forming dipole elements, and miniaturize the RFID tag (compared with conventional designs). Furthermore, in a case of the same size, a higher gain can be obtained.

Furthermore, the lands LA1 and LA2 on which the RFIC element 100 is mounted overlap the first coil portion CIL1, the second coil portion CIL2, the third coil portion CIL3 and the fourth coil portion CIL4 of the RFIC element 100 in the plan view. Consequently, the coil portions CIL1 to CIL4 are electromagnetically shielded by the lands LA1 and LA2, and thus are hardly influenced by electromagnetic characteristics of goods to which are the RFID tag is to be applied. That is, even when the RFID tag 301 is applied to goods of a high relative permittivity and relative magnetic permeability, the electromagnetic characteristics of the RFID tag change little between an applied state of the RFID tag and a single state of the RFID tag prior to the application.

Second Embodiment

A second embodiment will describe an RFID tag having a different shape of a dipole antenna from that described in the first embodiment.

Figure 14:
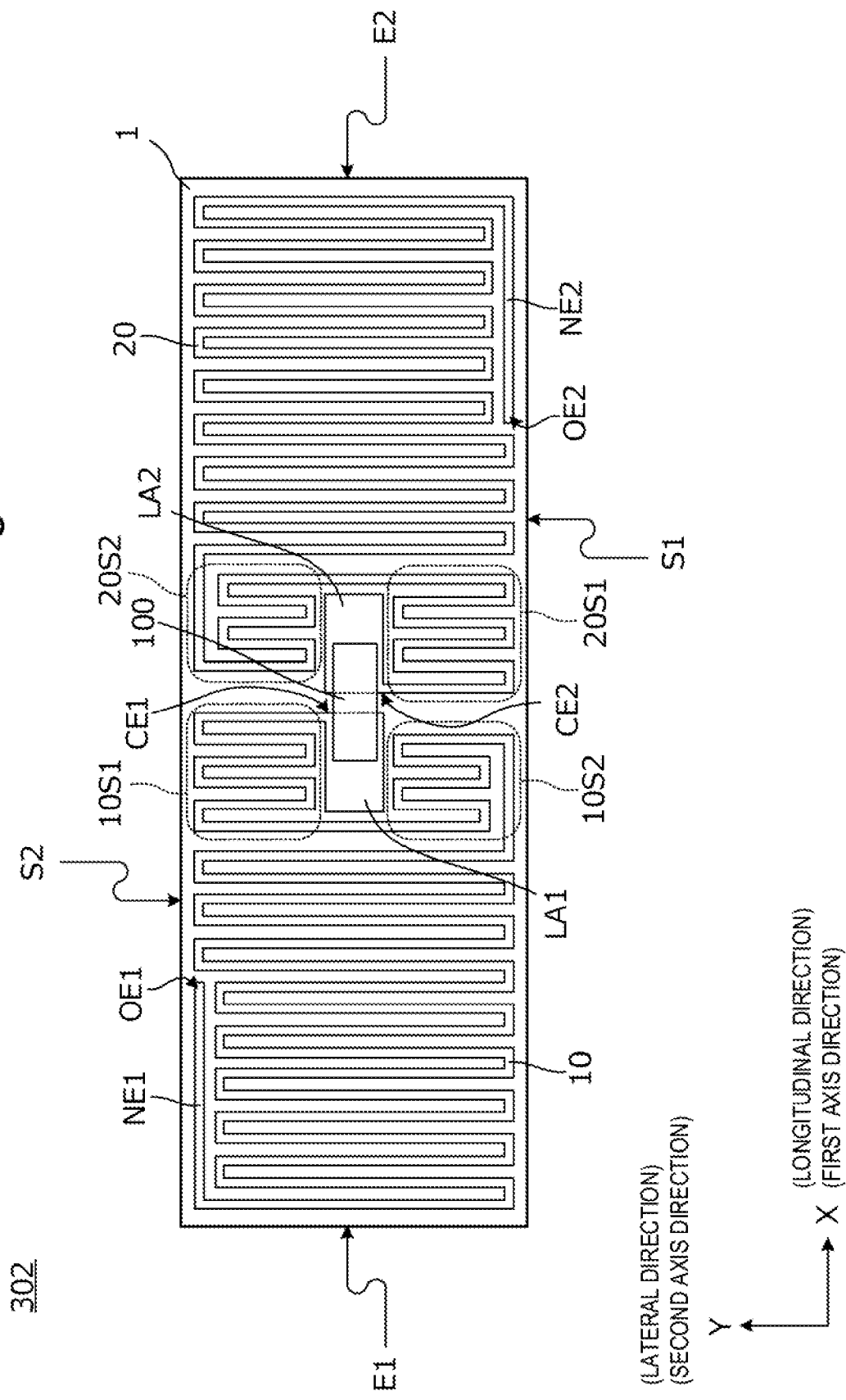
FIG. 14 is a plan view of an RFID tag 302 according to a second embodiment.

FIG. 14 is a plan view of an RFID tag 302 according to the second embodiment. The RFID tag 302 according to the present embodiment includes the substrate 1 of the rectangular shape, the first dipole element 10 and the second dipole element 20 which are formed on this substrate 1, and the RFIC element 100 which is mounted on the substrate 1.

In the same manner as described above for the first exemplary embodiment, the first dipole element 10 and the second dipole element 20 are formed on the substrate 1. These first dipole element 10 and second dipole element 20 form one dipole antenna.

The first end of the first dipole element 10 is the first connection end CE1 connected to the land LA1 (i.e., connected to the first input/output terminal of the RFIC element). The other (second) end of the first dipole element 10 is the first open end OE1. The first end of the second dipole element 20 is the second connection end CE2 connected to the land LA2 (i.e., connected to the second input/output terminal of the RFIC element). The other (second) end of the second dipole element 20 is the second open end OE2.

As shown, the first dipole element 10 includes first sub conductor patterns 10S1 and 10S2. The first sub conductor pattern 10S1 is disposed between the RFIC element 100 and the second side portion S2, and the first sub conductor pattern 10S2 is disposed between the RFIC element 100 and the first side portion S1. Similarly, the second dipole element 20 includes second sub conductor patterns 20S1 and 20S2. The second sub conductor pattern 20S1 is disposed between the RFIC element 100 and the first side portion S1, and the second sub conductor pattern 20S2 is disposed between the RFIC element 100 and the second side portion S2.

According to the present embodiment, the first sub conductor patterns 10S1 and 10S2 and the second sub conductor pattern 20S1 and 20S2 are formed, so that it is possible to effectively use the formation region of the dipole antenna and further miniaturize the formation region of the dipole antenna accordingly.

Furthermore, the land LA1 is formed between the first sub conductor pattern 10S1 and the first sub conductor pattern 10S2, so that the first sub conductor pattern 10S1 and the first sub conductor pattern 10S2 are prevented from being unnecessarily magnetically coupled. Similarly, the land LA2 is formed between the second sub conductor pattern 20S1 and the second sub conductor pattern 20S2, so that the second sub conductor pattern 20S1 and the second sub conductor pattern 20S2 are prevented from being unnecessarily magnetically coupled. Consequently, these first sub conductor patterns 10S1 and 10S2 and second sub conductor patterns 20S1 and 20S2 effectively function and are configured as part of a radiation element and an inductance element.

According to the present embodiment, the first sub conductor pattern 10S1 is part of the first interposed portion interposed between the first open end OE1 and the second dipole element 20. Similarly, the second sub conductor pattern 20S1 is part of the second interposed portion interposed between the second open end OE2 and the first dipole element 10. The other components are the same as those of the RFID tag 301 illustrated in FIG. 1.

Third Embodiment

A third embodiment will describe an RFID tag having a different shape of a dipole antenna from those described in the first and second embodiments.

Figure 15:
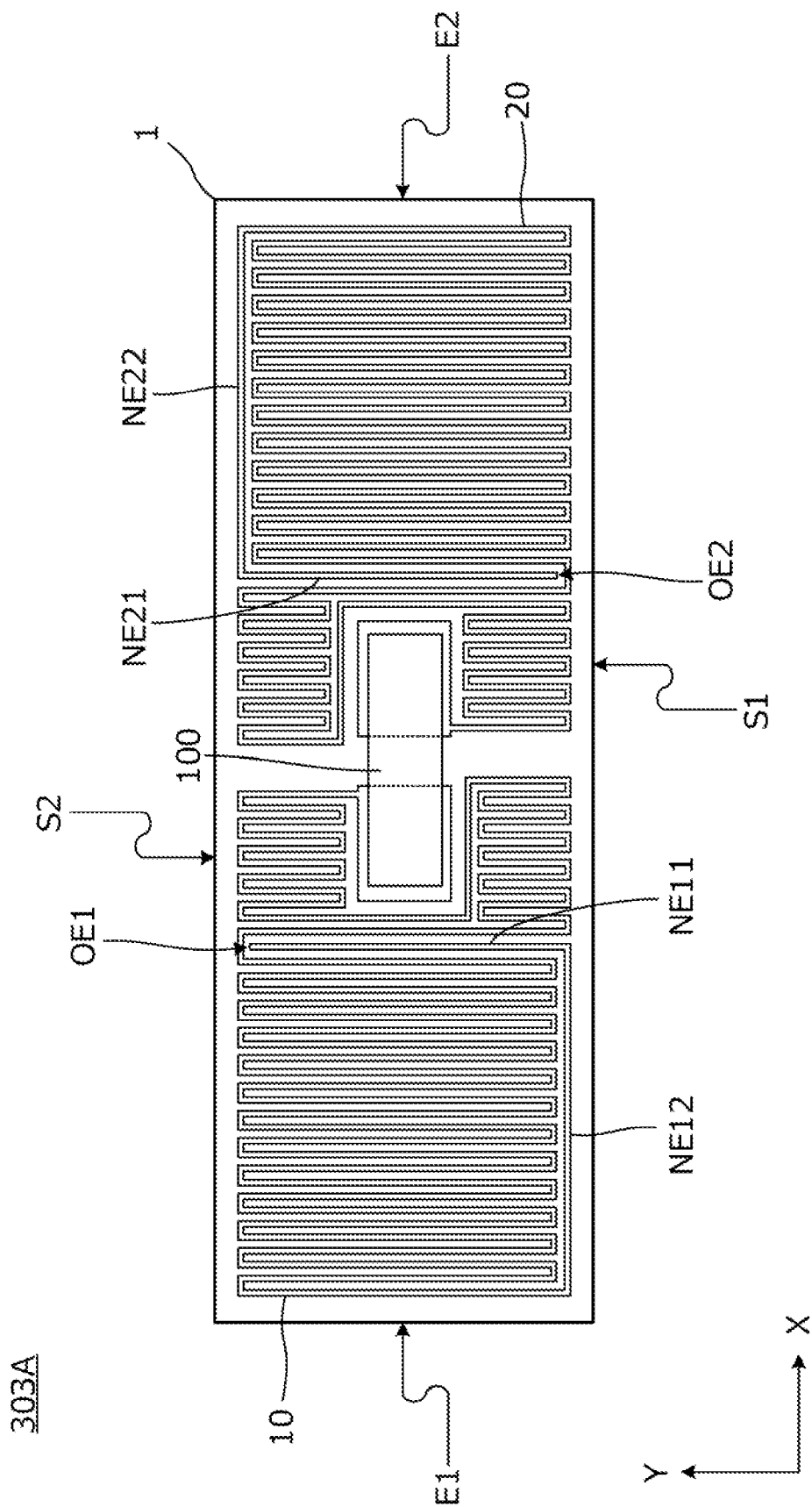
FIG. 15 is a plan view of an RFID tag 303A according to a third embodiment.

FIG. 15 is a plan view of an RFID tag 303A according to the third embodiment. The RFID tag 303A according to the present embodiment includes the substrate 1 of the rectangular shape, the first dipole element 10 and the second dipole element 20 formed on this substrate 1, and the RFIC element 100 mounted on the substrate 1.

The first open end OE1 of the first dipole element 10 and vicinity portions NE11 and NE12 of the first open end OE1 form a first fold-back portion. The first open end vicinity portion NE12 is a conductor pattern which is folded back from the first end portion E1 in a direction (X axis direction) of the second dipole element 20. The first open end vicinity portion NE11 is a conductor pattern which extends from a distal end of the first open end vicinity portion NE12 in a direction (Y axis direction) along the conductor pattern of the meandering-shaped meandering portion. Thus, the first open end OE1 and the first open end vicinity portion NE11 of the first dipole element 10 enter the gap of the meandering-shaped meandering portion of the first dipole element 10.

Similarly, the second open end OE2 of the second dipole element 20, and vicinity portions NE21 and NE22 of the second open end OE2 form a second fold-back portion. The second open end vicinity portion NE22 is a conductor pattern which is folded back from the second end portion E2 in a direction (i.e., negative X axis direction) of the first dipole element 10. The second open end vicinity portion NE21 is a conductor pattern which extends from a distal end of the second open end vicinity portion NE22 in a direction (i.e., negative Y axis direction) along the conductor pattern of the meandering-shaped meandering portion. Thus, the second open end OE2 and the second open end vicinity portion NE21 of the second dipole element 20 enter the gap of the meandering-shaped meandering portion of the second dipole element 20.

A capacitance is produced between the above first fold-back portion and part of the first dipole element which this first fold-back portion faces. Similarly, a capacitance is produced between the above second fold-back portion and part of the second dipole element which this second fold-back portion faces.

Figure 16:
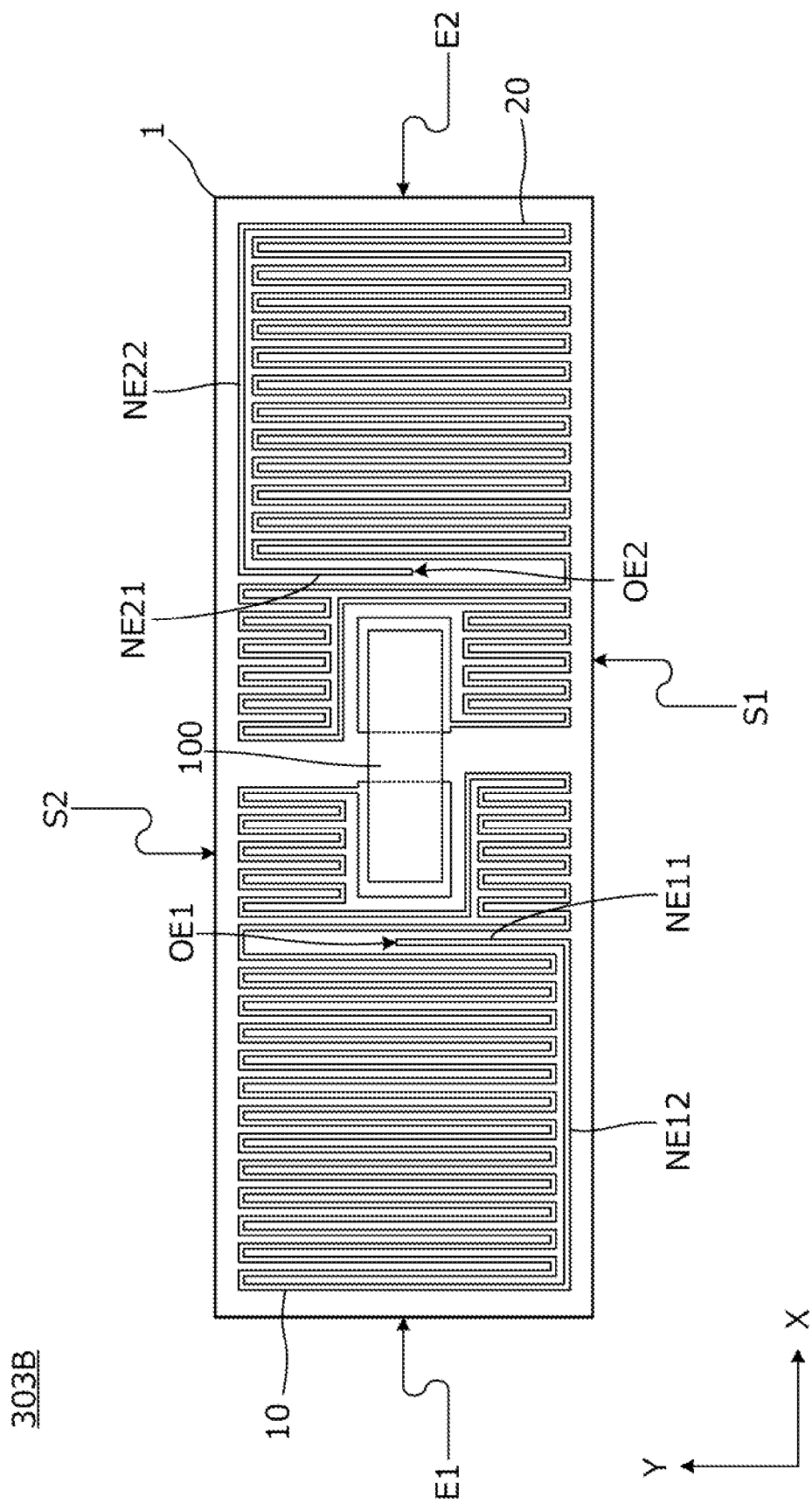
FIG. 16 is a plan view of an RFID tag 303B according to the third embodiment.

FIG. 16 is a plan view of another RFID tag 303B according to the third embodiment. The RFID tag 303B differs from the RFID tag 303A illustrated in FIG. 15 in a position of the first open end OE1 and a position of the second open end OE2. In an example illustrated in FIG. 16, the length of the first open end vicinity portion NE11 and the length of the second open end vicinity portion NE21 are shorter than those illustrated in FIG. 15.

Figure 17:
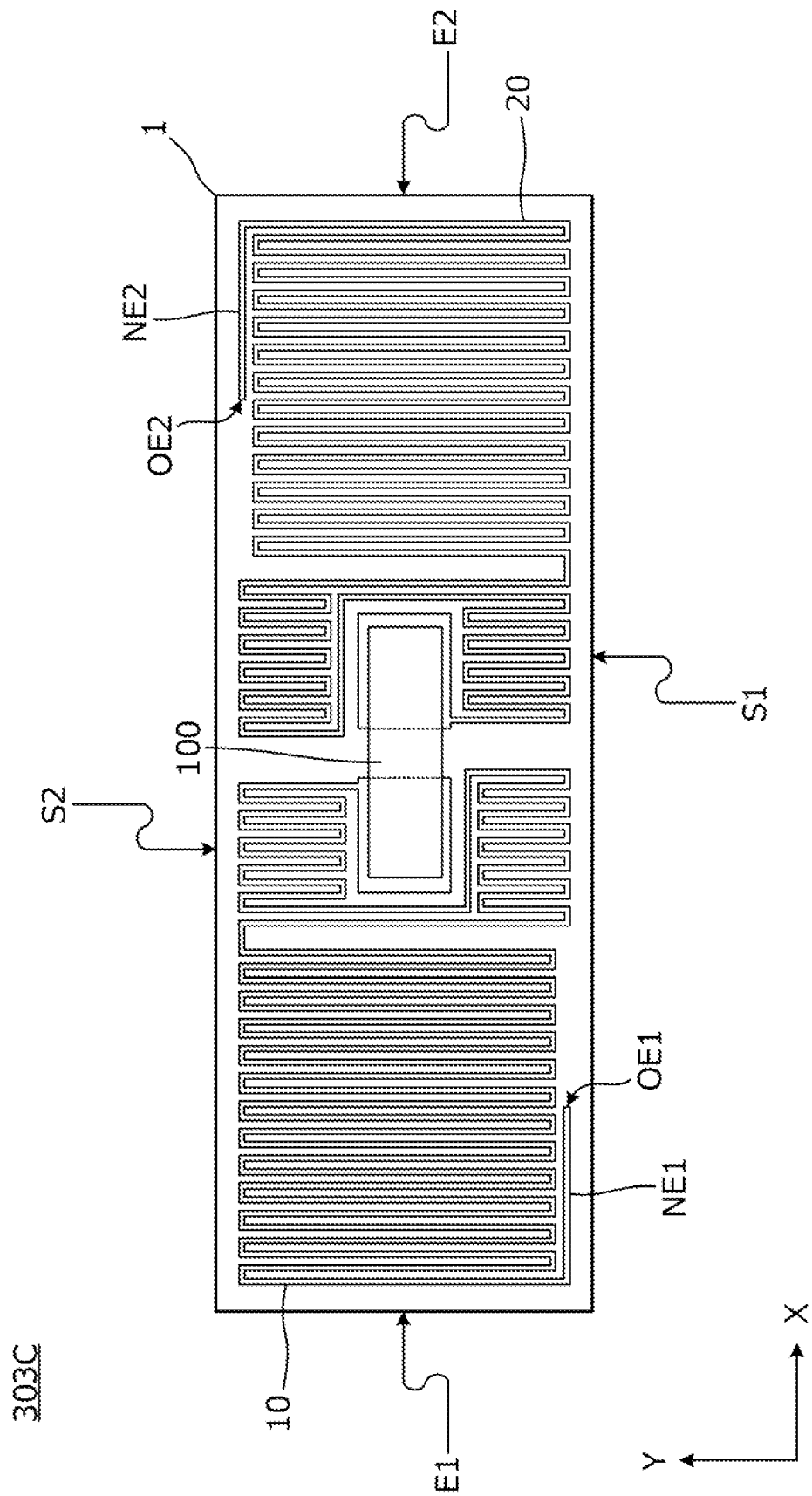
FIG. 17 is a plan view of an RFID tag 303C according to the third embodiment.

FIG. 17 is a plan view of still another RFID tag 303C according to the third embodiment. The RFID tag 303C differs from the RFID tag 303A illustrated in FIG. 15 in a position of the first open end OE1 and a position of the second open end OE2. In an example illustrated in FIG. 17, the first open end OE1 and the first open end vicinity portion NE1 of the first dipole element 10 do not enter the gap of the meandering-shaped meandering portion of the first dipole element 10. Similarly, the second open end OE2 and the second open end vicinity portion NE2 of the second dipole element 20 do not enter the gap of the meandering-shaped meandering portion of the second dipole element 20.

In this regard, when a resonance frequency of the dipole antenna of the RFID tag 303A is foA, a resonance frequency of the dipole antenna of the RFID tag 303B is foB and a resonance frequency of the dipole antenna of the RFID tag 303C is foC, a relationship of foA<foB<foC is satisfied. Thus, by changing the length of the fold-back portion, the resonance frequency of the antenna can be adjusted (i.e., set) as needed/desired. Furthermore, the open end OE1 of the first dipole element 10 is not equivalently (electromagnetically) seen from the second dipole element 20, and the open end OE2 of the second dipole element 20 is not equivalently (electromagnetically) seen from the first dipole element 10, so that a gain and directivity of the dipole antenna hardly change. Consequently, it is possible to adjust (set) the frequency of the dipole antenna independently from the gain and the directivity.

Furthermore, a facing distance between the above first fold-back portion and a portion of the first dipole element which faces the first fold-back portion, and a facing distance between the above second fold-back portion and a portion of the second dipole element which faces the second fold-back portion are close to approximately an inter-pattern distance of the meandering-shaped conductor patterns, so that there is hardly an influence of an external dielectric body. Furthermore, as illustrated in FIGS. 15 and 16 in particular, in a case of the structure that the open ends enter the gaps of the meandering-shaped meandering portions, a capacitance to be applied to the dipole elements is hardly influenced by an external dielectric body compared to a dipole antenna of a conventional structure in which wide conductor patterns for applying a capacitance are formed at distal end portions of dipole elements.

In addition, although each of the above embodiments has been described by using an RFID tag as an example, another embodiment is applicable likewise to wireless communication devices such as Bluetooth (registered trademark) modules and wireless LAN modules.

Lastly, description of the above embodiments is exemplary, and is not restrictive. One of ordinary skilled in art can optionally make modify and change the embodiments. The scope of the present invention is indicated not by the above embodiments, but by the claims. Furthermore, the scope of the present invention includes changes from the embodiments in a range equivalent to the claims.

What is claimed is:

1. A wireless communication device comprising:
   an RFIC element including first and second input/output terminals; and
   a dipole antenna including first and second dipole elements, with the first dipole element including a first end connected to the first input/output terminal and a second end that is an open end, and with the second dipole element including a first end connected to the second input/output terminal and a second end that is an open end,
   wherein the first dipole element includes:
      a first LC parallel circuit formed by the open end of the first dipole element and a first open end vicinity portion that is adjacent and extends to the open end of the first dipole element, and an intermediate portion of the first dipole element facing the open end of the first dipole element and the first open end vicinity portion, the first LC parallel circuit including a first capacitance component and a first parallel inductance component, and
      a first series inductance component that is connected in series between the first LC parallel circuit and the first end of the first dipole element, wherein the second dipole element includes:
      a second LC parallel circuit formed by the open end of the second dipole element and a second open end vicinity portion that is adjacent to and extends to the open end of the second dipole element, and an intermediate portion of the second dipole element facing the open end of the second dipole element and the second open end vicinity portion, the second LC parallel circuit including a second capacitance component and a second parallel inductance component, and
      a second series inductance component that is connected in series between the second LC parallel circuit and the first end of the second dipole element, and
   wherein the first and second LC parallel circuits comprise a resonance frequency that is not less than twice an operation frequency of the dipole antenna.

2. The wireless communication device according to claim 1, further comprising:
   a substrate with the RFIC element disposed at a center of a surface of the substrate,
   wherein the first and second open end vicinity portions are symmetrically disposed at positions relative to the RFIC element.

3. The wireless communication device according to claim 2,
   wherein the substrate of the dipole antenna includes first and second ends that face each other in a first axis direction in a plan view, and first and second sides that face each other in a second axis direction perpendicular to the first axis direction in the plan view,
   wherein the first dipole element comprises a first conductor pattern that includes a meandering portion that meanders between the first input/output terminal and the first end of the substrate, and
   wherein the second dipole element comprises a second conductor pattern that includes a meandering portion that meanders between the second input/output terminal and the second end of the substrate.

4. The wireless communication device according to claim 3,
wherein the open end of the first dipole element extends into a gap of the meandering portion of the first conductor pattern, and
wherein the open end of the second dipole element extends into a gap of the meandering portion of the second conductor pattern.

5. The wireless communication device according to claim 3,
wherein the first dipole element includes a first sub conductor pattern that is located between the RFIC element and one of the first and second sides of the substrate, and
wherein the second dipole element includes a second sub conductor pattern that is located between the RFIC element and one of the first and second sides of the substrate.

6. The wireless communication device according to claim 5,
wherein the first sub conductor pattern includes a plurality of first sub conductor patterns, and the second sub conductor pattern includes a plurality of second sub conductor patterns,
wherein the first sub conductor patterns sandwich a first land connected to the first input/output terminal of the RFIC element, and
wherein the second sub conductor patterns sandwich a second land connected to the second input/output terminal of the RFIC element.

7. The wireless communication device according to claim 3,
wherein the substrate of the dipole antenna includes a longitudinal direction and a lateral direction in the plan view, with the longitudinal direction corresponding to the first axis direction and the lateral direction corresponding to the second axis direction, and
wherein a dimension of the substrate in the longitudinal direction is not more than one eighth wavelength of an operation frequency of the dipole antenna.

8. The wireless communication device according to claim 7, wherein the dimension of the substrate in the longitudinal direction is not less than twice a dimension of the substrate in the lateral direction.

9. The wireless communication device according to claim 1, wherein the RFIC element is formed by integrating an RFIC chip, and an impedance matching circuit configured to match impedances of the RFIC chip and the dipole antenna.

10. The wireless communication device according to claim 1, wherein the RFIC element is configured to communicate in a UHF band via the dipole antenna.

11. A wireless communication device comprising:
a substrate;
an RFIC element provided at the substrate and including first and second input/output terminals; and
a dipole antenna disposed on the substrate and including first and second dipole elements that each include a connection end connected to the first and second input/output terminals, respectively, and an open end opposite the connection end,
wherein the first dipole element includes a first fold-back portion extending away from the respective open end, such that the open end faces an intermediate portion of the first dipole element, and a first meandering portion of a meandering shape, and
wherein the second dipole element includes a second fold-back portion extending away from the respective open end, such that the open end faces an intermediate portion of the second dipole element, and a second meandering portion of a meandering shape,
wherein the first meandering portion includes a first outer rim meandering portion farthest from the connection end of the first dipole element in a first axis direction perpendicular to an amplitude direction of the first and second meandering portions,
wherein the second meandering portion includes a second outer rim meandering portion farthest from the connection end of the second dipole element in the first axis direction,
wherein a portion of the first fold-back portion is provided in a gap of the first meandering portion, the gap of the first meandering portion not being nearest to the first outer rim meandering portion, and
wherein a portion of the second fold-back portion is provided in a gap of the second meandering portion, the gap of the second meandering portion not being nearest to the second outer rim meandering portion.

12. The wireless communication device according to claim 11,
wherein the RFIC element is disposed at a center of the substrate, and
wherein the first and second fold-back portions are symmetrically disposed at positions relative to the RFIC element.

13. The wireless communication device according to claim 11,
wherein a formation region of the dipole antenna includes a first side and a second side that face each other in a second axis direction perpendicular to the first axis direction,
wherein the first dipole element includes a first sub conductor pattern that is located between the RFIC element and one of the first and second sides of the formation region, and
wherein the second dipole element includes a second sub conductor pattern that is located between the RFIC element and one of the first and second sides of the formation region.

14. The wireless communication device according to claim 13,
wherein the first sub conductor pattern includes a plurality of first sub conductor patterns, and the second sub conductor pattern includes a plurality of second sub conductor patterns,
wherein the first sub conductor patterns sandwich a first land connected to the first input/output terminal of the RFIC element, and
wherein the second sub conductor patterns sandwich a second land connected to the second input/output terminal of the RFIC element.

15. The wireless communication device according to claim 11,
wherein a formation region of the dipole antenna includes a longitudinal direction and a lateral direction in the plan view, the longitudinal direction corresponding to the first axis direction, and
wherein a dimension of the formation region in the longitudinal direction is not more than one eighth wavelength of an operation frequency of the dipole antenna.

16. The wireless communication device according to claim 15, wherein the dimension of the formation region in the longitudinal direction is not less than twice a dimension of the formation region in the lateral direction.

17. The wireless communication device according to claim 11, wherein the RFIC element is formed by integrating an RFIC chip and an impedance matching circuit configured to match impedances of the RFIC chip and the dipole antenna.

18. The wireless communication device according to claim 11, wherein the RFIC element is configured to communicate in a UHF band via the dipole antenna.

19. The wireless communication device according to claim 11,
- wherein the first meandering portion is connected between the connection end of the first dipole element and the first fold-back portion, and includes a first linear portion and a second linear portion separate from the first linear portion in the first axis direction,
- wherein the gap of the first meandering portion is provided between the first linear portion and the second linear portion,
- wherein the second meandering portion is connected between the connection end of the second dipole element and the second fold-back portion, and includes a third linear portion and a fourth linear portion separate from the third linear portion in the first axis direction, and
- wherein the gap of the second meandering portion is provided between the third linear portion and the fourth linear portion.

* * * * *